United States Patent [19]

Koroncai et al.

[11] Patent Number: 4,982,306
[45] Date of Patent: Jan. 1, 1991

[54] METHOD OF LIMITING STARTING CURRENT IN A DC CONVERTER AND DEVICE FOR PERFORMING THE METHOD

[75] Inventors: Adam-Istvan Koroncai, Klagenfurt; Alexander Lechner, Faak/See, both of Austria

[73] Assignee: Siemens Aktiengesellschaft, Munich, Fed. Rep. of Germany

[21] Appl. No.: 247,077

[22] Filed: Sep. 20, 1988

[30] Foreign Application Priority Data

Sep. 22, 1987 [DE] Fed. Rep. of Germany ....... 3731834

[51] Int. Cl.⁵ .......................................... H02M 3/335
[52] U.S. Cl. ....................................... 361/58; 361/87; 323/311; 323/321; 323/901; 323/908
[58] Field of Search ...................... 361/58, 87; 363/52, 363/53, 55, 56; 323/201, 311, 321, 349, 901, 908

[56] References Cited

U.S. PATENT DOCUMENTS

| | | | |
|---|---|---|---|
| 4,595,873 | 6/1986 | Masil | 323/901 X |
| 4,731,574 | 3/1988 | Merbert | 323/908 X |
| 4,736,116 | 4/1988 | Paulak, Jr. et al. | 323/901 X |
| 4,791,544 | 12/1988 | Gautherin et al. | 323/901 X |

FOREIGN PATENT DOCUMENTS

| | | |
|---|---|---|
| 2247816 | 4/1974 | Fed. Rep. of Germany . |
| 3122835 | 1/1983 | Fed. Rep. of Germany . |
| 3308320 | 9/1984 | Fed. Rep. of Germany . |
| 3421520 | 12/1985 | Fed. Rep. of Germany . |

Primary Examiner—Derek S. Jennings
Attorney, Agent, or Firm—Herbert L. Lerner; Laurence A. Greenberg

[57] ABSTRACT

In a method and device for limiting the starting current of a DC converter, at least one buffer capacitor is initially charged through a load resistor. The current going through the load resistor is measured with a monitor. The monitor switches on a DC converter and bridges the load resistor once a switching threshold is reached. A predetermined minimum current is used as the switching threshold.

1 Claim, 1 Drawing Sheet

METHOD OF LIMITING STARTING CURRENT IN A DC CONVERTER AND DEVICE FOR PERFORMING THE METHOD

BACKGROUND OF THE INVENTION

The invention relates to a method and device for limiting the starting current of a DC converter, wherein at least one buffer capacitor is first charged through a load resistor and then, when a monitor determines that the switch threshold has been reached, the DC converter is switched on and the load resistor is bridged.

DESCRIPTION OF THE RELATED ART

DC converters are constructed to operate within a specific input voltage range. The lower input voltage is determined by the minimum voltage needed to operate the control circuit of the DC converter. The upper limit is fixed by the electrical strength of the circuit elements. Normally DC converters require one or more buffer capacitors on the input side with capacities into the millifarad range and charge currents limited by a load resistor. A starting of the DC converter below a specific input voltage is normally prevented by a monitor which will only allow the DC converter to switch on through an enabling input once a switch threshold has been reached.

When the minimum input voltage value has been obtained and the DC converter has been started, the load resistors for the buffer capacitor or capacitors are bridged in order to reduce stray power. When the DC converter switches on at the minimum input voltage threshold, the input current of the DC converter is already at its maximum value in accordance with the relationship in which the required input power for the DC converter is equal to the product of the voltage and the current. Thus it may occur that the source, in other words the input supply circuit, is unable to supply the required maximum voltage, and the DC converter cannot attain its control range.

For this reason it is desirable to match the starting threshold of the DC converter with the maximum source current. In many cases, however, the source parameters cannot be accurately determined or they are strongly influenced by other parameters such as line resistance. In the field of telephone electronics for example, the maximum current supplied by the telephone company is 50 mA, the allowable line resistance is below 1400 ohms and line voltages are between 20 and 96 V. Within these parameters, power may not exceed 800 mW.

A minimization or optimization of the starting current for the DC converter can only be obtained if the converter does not start until the maximum or optimum input voltage has been reached. Heretofore this problem was circumvented by measuring the source parameters and subsequently matching the switching threshold to these parameters, for instance as fixed starting thresholds. No integrated solutions are known.

It is accordingly an object of the invention to provide a method of limiting starting current in a DC converter and an integrated device for performing the method, which overcomes the hereinafore-mentioned disadvantages of the heretofore-known methods and devices of this general type and which will allow the starting threshold of the DC converter to be adapted to the source parameters.

SUMMARY OF THE INVENTION

With the foregoing and other objects in view there is provided, in accordance with the invention, a method of limiting the starting current of a DC converter, which comprises initially charging at least one buffer capacitor through a load resistor, measuring the current going through the load resistor with a monitor, switching on a DC converter and bridging the load resistor with the monitor once a switching threshold is reached, and using a predetermined minimum current as the switching threshold.

In accordance with another mode of the invention, there is provided a method which comprises using the voltage drop at the load resistor as the measurement of the current.

With the objects of the invention in view, there is also provided a device for limiting the starting current of a DC converter, comprising at least one buffer capacitor, a load resistor having terminals and being connected to the at least one buffer capacitor, and a monitor containing a comparator having inputs connected to the terminals and an output connected to an enabling connection of the DC converter, and a switch having a control connection connected to the output of the comparator.

In accordance with a further feature of the invention, the at least one buffer capacitor is charged through the load resistor, and the monitor measures the current going through the load resistor, switches on a DC converter and bridges the load resistor once a switching threshold in the form of a predetermined minimum current is reached.

In accordance with an added feature of the invention, there is provided a bias voltage source connected between one of the inputs of the comparator and one of the terminals of the load resistor for determining a switch threshold.

In accordance with a concomitant feature of the invention, the switch is an electronic switch.

Other features which are considered as characteristic for the invention are set forth in the appended claims.

Although the invention is illustrated and described herein as embodied in a method of limiting starting current in a DC converter and a device for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
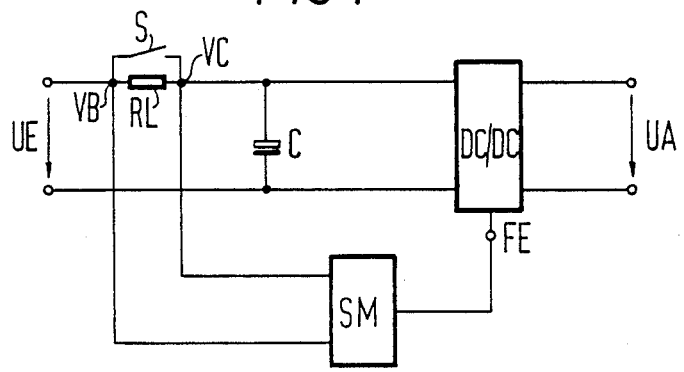
FIG. 1 is a schematic diagram of a circuit constructed in accordance with the invention, containing a DC converter, a buffer capacitor, a load resistor and a monitor.

Referring now in detail to the figures of the drawings in which identical elements have been given identical reference numerals and first, particularly, to FIG. 1 thereof, there is seen a DC converter DC/DC connected to a buffer capacitor C, which is in turn connected to an input voltage UE through a load resistor RL, in order to limit the load current. The load resistor RL is connected at pins or terminals VB and VC which are also connected to a switch S in order to bridge the load resistor RL. The inputs for an integrated monitor SM are also connected at the pins or terminals VB and VC. The output side of the monitor SM is connected to an enabling input FE of the DC converter DC/DC. With the circuit switched on, an output voltage UA is obtained from the DC converter DC/DC.

In the process for limiting the starting current of the DC converter DC/DC in accordance with the invention, the monitor SM measures the current flowing through the load resistor RL and uses this as the switching threshold to switch on the DC converter DC/DC through the enabling input FE, when the current reaches a predetermined minimum or optimum level. In accordance with the embodiment in FIG. 1, the voltage drop in the load resistor RL is measured for this purpose. If the voltage in the load resistor RL drops below a predetermined level, such as 2 volts, the charging process of the buffer capacitor can be seen as having been completed, and the maximum or optimum input voltage as having been reached. With the subsequent start of the DC converter DC/DC, the starting current has been minimized or optimized independently of the parameters of the source or input.

Figure 2:
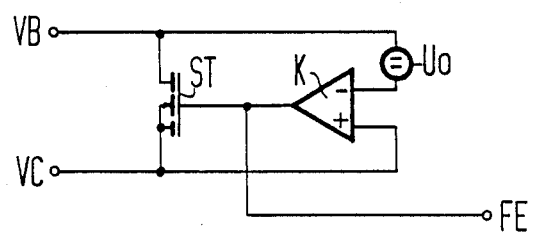
FIG. 2 is a circuit diagram showing an integrated starting current limitation device in accordance with the invention.

FIG. 2 shows an embodiment of an integrated starting current limitation device in accordance with FIG. 1. The junctions or pins or terminals VB and VC to which the load resistor RL is connected, are also connected to a controlled line of a power transistor ST which acts as a switch, as well as to inputs of a comparator K. In this configuration, the non-inverting input of the comparator K is connected directly to the pin or terminal VC, and the inverting input of the comparator K is connected to the pin or terminal VB through a direct current source which provides a bias voltage Uo. The output of the comparator K is connected to the control connection of the switching transistor ST and to the pin or terminal of the enabling input FE of the DC converter DC/DC. The bias voltage source Uo connected to the inverting input of the comparator K delivers a bias voltage equivalent to the value at which the charging process of the buffer capacitor can be seen as having been completed. The comparator K measures the voltage drop at the load resistor RL which is connected between pins or terminals the VB and VC. If this voltage drops to the same value as Uo during the charging of the buffer capacitor, the load resistor RL is bridged by the switching transistor ST and an enabling signal is sent to the DC converter DC/DC.

Following the principles of this invention, it becomes possible to switch the DC converter DC/DC, independently of the unknown source parameters and inputs, and to bridge the load resistor RL for one or more buffer capacitors whenever the charging process for this or these buffer capacitors is totally or nearly completed, so that the starting current of the DC converter DC/DC is either minimized or optimized. Naturally, there are many ways of constructing this invention, and FIG. 1 and FIG. 2 are merely typical embodiments. The embodiment of FIG. 2 has the further advantage of being monolithically integrable.

We claim:

1. Device for limiting the starting current of a DC converter, comprising at least one buffer capacitor, a load resistor having terminals and being connected to said buffer capacitor, a monitor containing a comparator having inputs connected to said terminals and an output, an enabling connection of the DC-converter connected to said output, an electronic switch having a control connection connected to said output of said comparator, bridging said load resistor; means for determining a switching threshold connected to said comparator, said threshold being predetermined as a minimum current through said resistor; wherein said buffer capacitor is charged through said load resistor, and said monitor measures the current going through the load resistor, switches on the DC-converter and bridges the load resistor once the switching threshold in the form of said predetermined minimum current is reached; and including a bias voltage source connected between one of said inputs of said comparator and one of said terminals of said load resistor for determining said switching threshold, and wherein said device is an integrated device.

* * * * *